United States Patent
Beard et al.

(10) Patent No.: US 10,565,126 B2
(45) Date of Patent: Feb. 18, 2020

(54) METHOD AND APPARATUS FOR TWO-LAYER COPY-ON-WRITE

(71) Applicant: ARM LTD, Cambridge (GB)

(72) Inventors: Jonathan Curtis Beard, Austin, TX (US); Roxana Rusitoru, Cambridge (GB); Curtis Glenn Dunham, Austin, TX (US)

(73) Assignee: Arm Limited, Cambridge (GB)

( * ) Notice: Subject to any disclaimer, the term of this patent is extended or adjusted under 35 U.S.C. 154(b) by 87 days.

(21) Appl. No.: 15/649,930

(22) Filed: Jul. 14, 2017

(65) Prior Publication Data

US 2019/0018790 A1 Jan. 17, 2019

(51) Int. Cl.
*G06F 12/1036* (2016.01)
*G06F 12/1045* (2016.01)
(Continued)

(52) U.S. Cl.
CPC ........ *G06F 12/1036* (2013.01); *G06F 12/109* (2013.01); *G06F 12/1054* (2013.01);
(Continued)

(58) Field of Classification Search
CPC ............... G06F 3/00; G06F 3/06–0689; G06F 5/00–16; G06F 9/00–548;
(Continued)

(56) References Cited

U.S. PATENT DOCUMENTS

| 4,347,565 A | 8/1982 | Kaneda et al. |
| 4,792,897 A | 12/1988 | Gotou et al. |

(Continued)

FOREIGN PATENT DOCUMENTS

| EP | 3 128 415 | 2/2017 |
| WO | WO 2016/160220 | 10/2016 |

(Continued)

OTHER PUBLICATIONS

J. Gandhi et al., "Range Translations for Fast Virtual Memory," in IEEE Micro, vol. 36, No. 3, pp. 118-126, May-Jun. 2016. doi: 10.1109/MM.2016.10; cited on IDS filed Jul. 26, 2017 (Year: 2016).*

(Continued)

*Primary Examiner* — Daniel C. Chappell
(74) *Attorney, Agent, or Firm* — Leveque IP Law, P.C.

(57) ABSTRACT

A system, apparatus and method are provided in which a range of virtual memory addresses and a copy of that range are mapped to the same first system address range in a data processing system until an address in the virtual memory address range, or its copy, is written to. The common system address range includes a number of divisions. Responsive to a write request to an address in a division of the common address range, a second system address range is generated. The second system address range is mapped to the same physical addresses as the first system address range, except that the division containing the address to be written to and its corresponding division in the second system address range are mapped to different physical addresses. First layer mapping data may be stored in a range table buffer and updated when the second system address range is generated.

19 Claims, 8 Drawing Sheets

(51) Int. Cl.
*G06F 12/1081* (2016.01)
*G06F 12/109* (2016.01)

(52) U.S. Cl.
CPC .... *G06F 12/1081* (2013.01); *G06F 2212/151* (2013.01); *G06F 2212/651* (2013.01); *G06F 2212/656* (2013.01); *G06F 2212/657* (2013.01)

(58) Field of Classification Search
CPC ..... G06F 11/00–3696; G06F 12/00–16; G06F 13/00–4295; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | |
|---|---|---|---|
| 5,361,337 A | 11/1994 | Okin | |
| 5,426,750 A | 6/1995 | Becker et al. | |
| 5,577,231 A | 11/1996 | Scalzi et al. | |
| 5,752,275 A | 5/1998 | Hammond | |
| 5,867,649 A | 2/1999 | Larson | |
| 6,021,476 A | 2/2000 | Segars | |
| 6,075,938 A * | 6/2000 | Bugnion | G06F 9/544 703/27 |
| 6,345,241 B1 | 2/2002 | Brice | |
| 6,349,355 B1 * | 2/2002 | Draves | G06F 9/4843 711/6 |
| 6,633,963 B1 | 10/2003 | Ellison et al. | |
| 6,704,873 B1 | 3/2004 | Underwood | |
| 6,715,145 B1 | 3/2004 | Bowman-Amuah | |
| 6,731,288 B2 | 5/2004 | Parsons | |
| 6,789,156 B1 * | 9/2004 | Waldspurger | G06F 12/1018 711/6 |
| 6,822,959 B2 | 11/2004 | Galbi et al. | |
| 7,181,594 B2 | 2/2007 | Wilkinson et al. | |
| 7,225,300 B1 | 5/2007 | Choquette et al. | |
| 7,343,603 B1 | 3/2008 | Fresko | |
| 7,356,667 B2 | 4/2008 | Harris et al. | |
| 7,373,466 B1 | 5/2008 | Conway | |
| 7,424,599 B2 | 9/2008 | Kissell et al. | |
| 7,437,724 B2 | 10/2008 | Wolrich et al. | |
| 7,472,253 B1 * | 12/2008 | Cameron | G06F 12/1045 711/203 |
| 7,512,769 B1 | 3/2009 | Lowell et al. | |
| 7,668,165 B2 | 2/2010 | Hoskote | |
| 7,840,765 B2 * | 11/2010 | VelurEunni | G06F 12/1081 711/156 |
| 8,176,279 B2 * | 5/2012 | Farrell | G06F 11/0712 711/163 |
| 8,250,519 B2 * | 8/2012 | Budko | G06F 21/53 717/100 |
| 8,327,187 B1 | 12/2012 | Metcalf | |
| 8,386,745 B2 | 2/2013 | Kegel et al. | |
| 8,656,397 B2 | 2/2014 | Eidus et al. | |
| 8,667,249 B2 | 3/2014 | Baxter et al. | |
| 8,850,168 B2 | 9/2014 | Yamamoto et al. | |
| 8,984,255 B2 | 3/2015 | Hsu et al. | |
| 9,081,501 B2 | 7/2015 | Asaad et al. | |
| 9,081,706 B2 | 7/2015 | Koka et al. | |
| 9,104,544 B1 * | 8/2015 | Uchronski | G06F 12/02 |
| 9,116,793 B2 * | 8/2015 | Kandiraju | G06F 12/0246 |
| 9,122,714 B2 * | 9/2015 | Varadarajan | G06F 11/1438 |
| 9,208,103 B2 | 12/2015 | Kessler et al. | |
| 9,235,529 B2 | 1/2016 | Koka et al. | |
| 9,250,901 B2 | 2/2016 | Sodhi et al. | |
| 9,251,089 B2 * | 2/2016 | Gschwind | G06F 12/0292 |
| 9,268,694 B2 | 2/2016 | Snyder et al. | |
| 9,274,974 B1 * | 3/2016 | Chen | G06F 12/109 |
| 9,330,013 B2 * | 5/2016 | Li | G06F 9/45558 |
| 9,367,459 B2 | 6/2016 | Yamashita et al. | |
| 9,436,395 B2 * | 9/2016 | Hechtman | G06F 3/0619 |
| 9,471,226 B2 * | 10/2016 | Tsirkin | G06F 3/061 |
| 9,582,312 B1 | 2/2017 | Karppanen | |
| 9,639,476 B2 | 5/2017 | Chin et al. | |
| 9,645,941 B2 | 5/2017 | Mukherjee et al. | |
| 9,690,714 B1 | 6/2017 | Sites | |
| 9,740,637 B2 * | 8/2017 | Chen | G06F 12/1408 |
| 9,785,557 B1 | 10/2017 | Frey et al. | |
| 9,836,402 B1 * | 12/2017 | Riel | G06F 12/0868 |
| 9,886,210 B2 * | 2/2018 | Frank | G06F 3/0647 |
| 9,886,398 B2 * | 2/2018 | Gaonkar | G06F 12/145 |
| 9,886,449 B1 * | 2/2018 | Van Riel | G06F 3/0613 |
| 9,996,386 B2 | 6/2018 | Rauchfuss et al. | |
| 10,037,227 B2 | 7/2018 | Therien et al. | |
| 10,114,958 B2 | 10/2018 | Sell | |
| 10,133,675 B2 | 11/2018 | Hansson et al. | |
| 10,180,913 B1 | 1/2019 | Aingaran et al. | |
| 10,242,042 B2 * | 3/2019 | Vaquero Gonzalez | G06F 3/0619 |
| 2002/0026502 A1 | 2/2002 | Phillips | |
| 2004/0064668 A1 | 4/2004 | Kjos et al. | |
| 2004/0117593 A1 | 6/2004 | Uhlig et al. | |
| 2004/0215893 A1 | 10/2004 | Emerson et al. | |
| 2005/0010728 A1 | 1/2005 | Piry et al. | |
| 2005/0138515 A1 * | 6/2005 | Hyduke | G06F 11/261 714/741 |
| 2005/0165758 A1 | 7/2005 | Kasten et al. | |
| 2005/0273571 A1 | 12/2005 | Lyon et al. | |
| 2006/0253894 A1 | 11/2006 | Bookman | |
| 2006/0277390 A1 | 12/2006 | Zuraski et al. | |
| 2006/0288177 A1 | 12/2006 | Shaw | |
| 2007/0180197 A1 | 8/2007 | Wright | |
| 2007/0186054 A1 | 8/2007 | Kruckmeyer et al. | |
| 2008/0104557 A1 * | 5/2008 | Gopalakrishnan | G06F 17/505 716/115 |
| 2008/0270653 A1 | 10/2008 | Balle et al. | |
| 2009/0089537 A1 * | 4/2009 | Vick | G06F 12/0284 711/203 |
| 2009/0113164 A1 * | 4/2009 | Rajamony | G06F 12/1063 711/202 |
| 2009/0172343 A1 | 7/2009 | Savagaonkar | |
| 2009/0182971 A1 | 7/2009 | Greiner et al. | |
| 2009/0234987 A1 | 9/2009 | Lee et al. | |
| 2011/0113410 A1 | 5/2011 | Loen | |
| 2011/0145542 A1 | 6/2011 | Morrow | |
| 2011/0208935 A1 | 8/2011 | Grisenthwaite | |
| 2012/0324148 A1 | 12/2012 | Stonelake et al. | |
| 2013/0179666 A1 | 7/2013 | Yamashita et al. | |
| 2013/0227248 A1 * | 8/2013 | Mehta | G06F 12/1027 711/207 |
| 2014/0006734 A1 | 1/2014 | Li et al. | |
| 2014/0013074 A1 | 1/2014 | Koka | |
| 2014/0052917 A1 | 2/2014 | Koka et al. | |
| 2014/0208064 A1 | 7/2014 | Basu et al. | |
| 2014/0281363 A1 | 9/2014 | Tian | |
| 2014/0351519 A1 | 11/2014 | Munoz | |
| 2015/0106571 A1 | 4/2015 | Bernard et al. | |
| 2015/0205885 A1 | 7/2015 | Zhou et al. | |
| 2015/0254104 A1 | 9/2015 | Kessler et al. | |
| 2015/0286639 A1 | 10/2015 | Bordawekar | |
| 2015/0301949 A1 * | 10/2015 | Koka | G06F 12/10 711/147 |
| 2015/0301951 A1 | 10/2015 | Bybell et al. | |
| 2015/0325272 A1 | 11/2015 | Murphy | |
| 2016/0085677 A1 | 3/2016 | Loh et al. | |
| 2016/0147555 A1 | 5/2016 | Hepkin | |
| 2016/0147620 A1 | 5/2016 | Lesartre et al. | |
| 2016/0239415 A1 | 8/2016 | David et al. | |
| 2016/0283399 A1 | 9/2016 | Das | |
| 2017/0031832 A1 * | 2/2017 | Hwang | G06F 12/10 |
| 2017/0109289 A1 | 4/2017 | Gonzalez | |
| 2017/0147254 A1 * | 5/2017 | Adams | G06F 12/0638 |
| 2017/0153987 A1 * | 6/2017 | Gaonkar | G06F 12/145 |
| 2017/0161194 A1 | 6/2017 | Loh | |
| 2017/0177484 A1 | 6/2017 | Conway | |
| 2017/0236243 A1 | 8/2017 | Smith | |

(56) References Cited

U.S. PATENT DOCUMENTS

| | | |
|---|---|---|
| 2017/0286421 A1 | 10/2017 | Hayenga et al. |
| 2017/0329718 A1* | 11/2017 | Rose .................. G06F 12/1027 |
| 2018/0018278 A1 | 1/2018 | Bradbury et al. |
| 2018/0150315 A1 | 5/2018 | Dunham et al. |
| 2018/0150321 A1 | 5/2018 | Dunham et al. |
| 2018/0150322 A1 | 5/2018 | Dunham et al. |

FOREIGN PATENT DOCUMENTS

| | | |
|---|---|---|
| WO | WO 2016/162817 | 10/2016 |
| WO | WO 2016/204913 | 12/2016 |

OTHER PUBLICATIONS

Hybrid TLB Coalescing: Improving TLB Translation Coverage under Diverse Fragmented Memory Allocations; Park et al.; 2017 ACM/IEEE 44th Annual International Symposium on Computer Architecture (ISCA); Jun. 24-28, 2017 (Year: 2017).*

Arm, "ARMv8-A Address Translation," https://static.docs.arm.com/100940/0100/armv8_a_address%20translation_100940_0100_en.pdf, Feb. 28, 2017.

Yang, Junfeng, "Process and Address Space," https://web.archive.org/web/20170329090956if_/http://www.cs.columbia.edu:80/"junfeng/12sp-w4118/lectures/104-proc.pdf, Mar. 29, 2017.

Anonymous, "Fork (system call)," https://web.archive.org/web/20150124080230/https://en.wikipedia.org/wiki/Fork_(system_call), Jan. 24, 2015.

Oehmke, David W., Nathan L. Binkert, Steven K. Reinhardt and Trevor J Mudge. "Design and Applications of a Virtual Context Architecture." (2004).

Jayneel Gandhi, "Efficient Memory Virtualization," Thesis, University of Wisconsin-Madison, Aug. 19, 2016.

Memory Management Basics, www.idc-online.com/technical_references/pdfs/information_technology/Memory_Management_Basics.pdf, 2014.

Zhong Shao, CS422/522 Design & Implementation of Operating Systems Lecture 13: Address Translation, Yale University, Oct. 15, 2015, https://web.archive.org/web/20151217223456/http://flint.cs.yale.edu/cs422/lectureNotes/L13.pdf.

Rouse, Margaret, Definition translation lookaside buffer (TLB), https://whatis.techtarget.com/definition/translation-look-aside-buffer-TLB, Sep. 2014.

Anedda et al., "Suspending, migrating and resuming HPC virtual clusters," Future Generation Computer Systems 26, May 20, 2010, pp. 1063-1072.

Basu et al, "Efficient virtual memory for big memory servers," ACM SIGARCH Computer Architecture News—ICSA '13, vol. 41 Issue 3, Jun. 2013, pp. 237-248.

J. Gandhi et al., "Range Translations for Fast Virtual Memory," in IEEE Micro, vol. 36, No. 3, pp. 118-126, May-Jun. 2016. doi: 10.1109/MM.2016.10.

Karakostas et al., "Redundant Memory Mappings for Fast Access to Large Memories," ISCA'15, Jun. 13-17, 2015.

R. W. Pfile, D. A. Wood and S. K. Reinhardt, "Decoupled Hardware Support for Distributed Shared Memory," Computer Architecture, 1996 23rd Annual International Symposium on, May 24, 1996, pp. 34-34. doi: 10.1109/ISCA.1996.10010.

Petter Svärd, Benoit Hudzia, Johan Tordsson, and Erik Elmroth. 2011. Evaluation of delta compression techniques for efficient live migration of large virtual machines. In Proceedings of the 7th ACM SIGPLAN/SIGOPS international conference on Virtual execution environments (VEE '11). Jul. 2011, ACM, New York, NY, USA, 111-120. DOI=http://dx.doi.org/10.1145/1952682.1952698.

U.S. Appl. No. 15/361,871, filed Nov. 28, 2016 entitled "Data Processing", Applicant ARM LTD.

U.S. Appl. No. 15/361,819, filed Nov. 28, 2016 entitled "Data Processing", Applicant ARM LTD.

U.S. Appl. No. 15/361,770, filed Nov. 28, 2016 entitled "Data Processing", Applicant ARM LTD.

Bang, Kwanhu & Park, Sang-Hoon & Jun, Minje & Chung, Eui-Young. (2011). A memory hierarchy-aware metadata management technique for Solid State Disks. Midwest Symposium on Circuits and Systems. 1-4.

C. H. Park, T. Heo, J. Jeong and J. Huh, "Hybrid TLB coalescing: Improving TLB translation coverage under diverse fragmented memory allocations," 2017 ACM/IEEE 44th Annual International Symposium on Computer Architecture (ISCA), Toronto, ON, 2017, pp. 444-456.

Chao-Jui Chang, Jan-Jan Wu, Wei-Chung Hsu, Pangfeng Liu, and Pen-Chung Yew. 2014. Efficient memory virtualization for Cross-ISA system mode emulation. SIGPLAN Not. 49, 7 (Mar. 2014), 117-128.

Grocutt et al., U.S. Appl. No. 15/825,524 unpublished application, filed Nov. 29, 2017.

L. Fiorin, G. Palermo, S. Lukovic, V. Catalano and C. Silvan, "Secure Memory Accesses on Networks-on-Chip," in IEEE Transactions on Computers, vol. 57, No. 9, pp. 1216-1229, Sep. 2008.

M. D. Flouris and A. Bilas, "Violin: a framework for extensible block-level storage," 22nd IEEE / 13th NASA Goddard Conference on Mass Storage Systems and Technologies (MSST'05), Monterey, CA, USA, 2005, pp. 128-142.

Porquet, J & Greiner, A & Schwarz, C., "NoC-MPU: A secure architecture for flexible co-hosting on shared memory MPSoCs, " Design, Automation & Test. in Europe, 1-4, 2001.

Sambit K. Shukla, Laxmi N. Bhuyan, "A hybrid shared memory heterogenous execution platform for PCIe-based GPGPUs," 2013 20th International Conference on High Performance Computing (HiPC), vol. 1, pp. 343-352, 2013.

T. Wood et al., "CloudNet: Dynamic Pooling of Cloud Resources by Live WAN Migration of Virtual Machines," in IEEE/ACM Transactions on Networking, vol. 23, No. 5, pp. 1568-1583, Oct. 2015.

* cited by examiner

FIG. 7

RANGE TABLE ENTRY A (700)

| P | OFFSET | VA_BASE | VA_EXTENT | |
|---|---|---|---|---|
| - | OFFSET | VA_BASE | VA_EXTENT | PRE-COPY |
| - | OFFSET | VA_BASE | VA_EXTENT | COPY STEP 1 |
| C | OFFSET | VA_BASE | VA_EXTENT | COPY STEP 2 |
| C | OFFSET | VA_BASE | VA_EXTENT | COPY STEP 3 |
| C | OFFSET | VA_BASE | VA_EXTENT | WRITE STEP 1 |
| - | OFFSET | VA_BASE | VA_EXTENT | WRITE STEP 2 |

(708: P, 706: OFFSET, 702: VA_BASE, 704: VA_EXTENT, 710)

RANGE TABLE ENTRY A-COPY (712)

| P | OFFSET | VA_BASE | VA_EXTENT | |
|---|---|---|---|---|
| - | - | - | - | PRE-COPY |
| P | OFFSET | VA_BASE | VA_EXTENT | COPY STEP 1 |
| P | OFFSET | VA_BASE | VA_EXTENT | COPY STEP 2 |
| P | NEW OFFSET | NEW VA_BASE | VA_EXTENT | COPY STEP 3 |
| P | UPDATED OFFSET | NEW VA_BASE | VA_EXTENT | WRITE STEP 1 |
| P | UPDATED OFFSET | NEW VA_BASE | VA_EXTENT | WRITE STEP 2 |

(722: -, 720: P, 718: OFFSET, 714: VA_BASE, 716: VA_EXTENT)

METHOD AND APPARATUS FOR TWO-LAYER COPY-ON-WRITE

STATEMENT REGARDING FEDERALLY SPONSORED RESEARCH OR DEVELOPMENT

This invention was made with Government support under the Fast Forward 2 contract awarded by DOE. The Government has certain rights in this invention.

CROSS-REFERENCE TO RELATED APPLICATIONS

This application is related to co-pending patent application Ser. No. 15/649,976 entitled "METHOD AND APPARATUS FOR FAST CONTEXT CLONING IN A DATA PROCESSING SYSTEM"; co-pending patent application Ser. No. 15/650,008 entitled "MEMORY NODE CONTROLLER" and co-pending patent application Ser. No. 15/650,056 entitled "MEMORY ADDRESS TRANSLATION", all filed on the same date as this application, and which are hereby incorporated herein by reference herein in their entirety.

TECHNICAL FIELD

The present disclosure relates to the control of memory in a data processing system.

BACKGROUND

A data processing apparatus may include one or more processing cores. The processor cores, or programs executed thereon, are arranged to process data in accordance with virtual memory addresses. For example, each of the processor cores may process data in accordance with virtual memory addresses in a respective virtual memory address space, for example under the control of an operating system or a so-called hypervisor which allocates virtual memory address spaces to the processes being performed by the different processor cores, partly as a technique for avoiding a process associated with one processor core accidently or maliciously accessing data appropriate to a process being executed by another of the processor cores.

When an access is required to a virtual memory address, it is first necessary to translate the virtual memory address to a physical memory address so that the required information can be obtained from or written to the physical memory or a physical memory cache. A cache known as a translation lookaside buffer (TLB) may be used as part of the address translation process. The TLB stores recently or commonly used translations between virtual and physical memory addresses, on a fixed size page-by-page basis. So, as a first step in an address translation process, a TLB may be consulted to detect whether the TLB already contains the required address translation. If not, then a more involved translation process may be used, for example involving consulting so-called page tables holding address translation information, typically resulting in the TLB being populated with the required translation. A disadvantage of this approach is that the operating system is utilized to copy data from one virtual memory address space to another, which slows down operation. A further disadvantage is that data resources, such as memory and storage, are not used efficiently. For example, two physical copies of the data may be stored—even if the data is not modified. In this case, additional resources are needed to actually copy the data.

One approach to improve efficiency is a 'copy-on-write' mechanism. In this approach, the physical copying of data is deferred until the data is written or modified. Until then, data is shared. However, this approach is still not efficient, since the mechanism is performed by the operating system.

BRIEF DESCRIPTION OF THE DRAWINGS

FIG. 7 illustrates range table entries in two-layer, copy-on-write mechanism, consistent with embodiments of the disclosure.

DETAILED DESCRIPTION OF THE EMBODIMENTS

Figure 1:
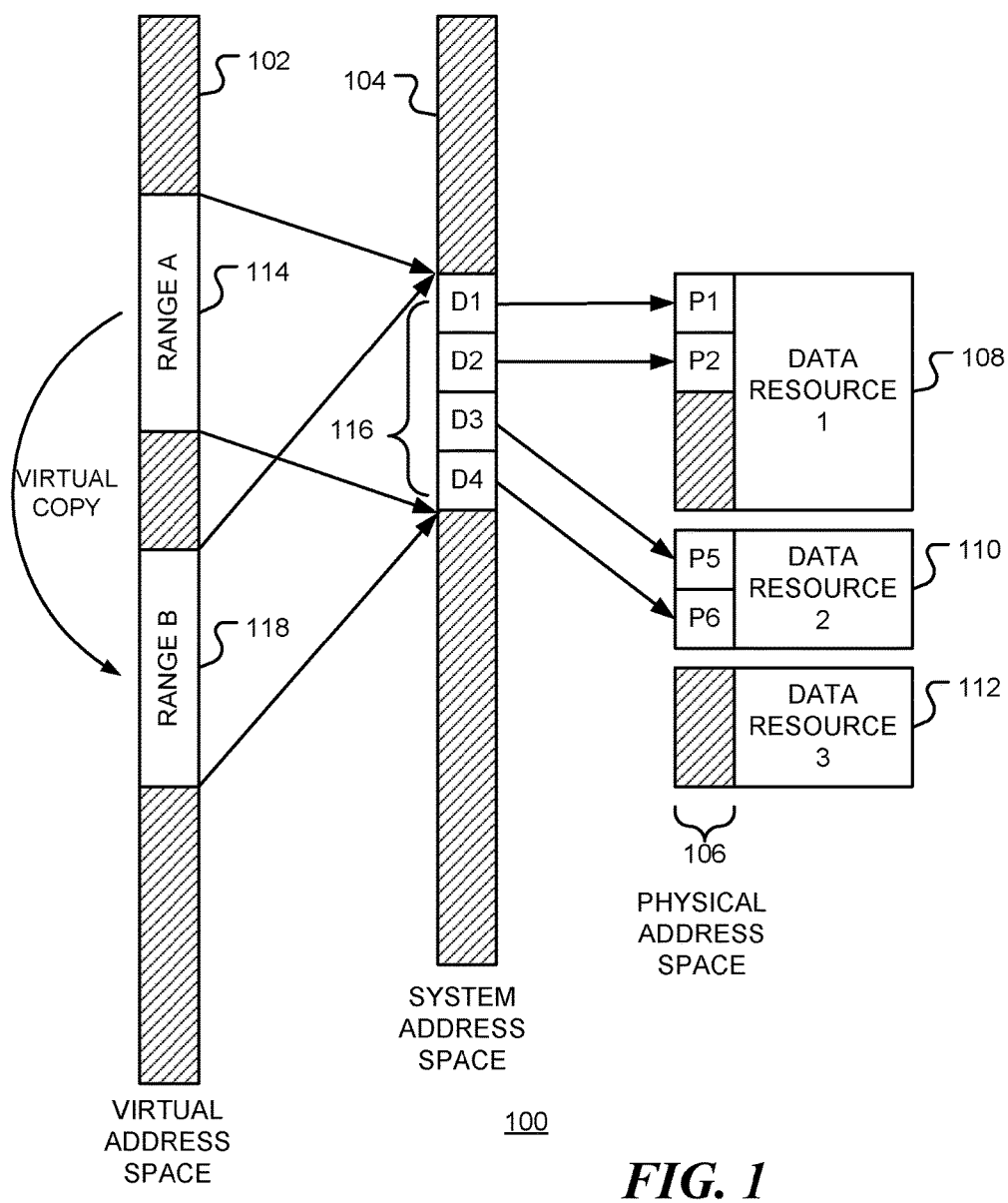
FIG. 1 illustrates a logical arrangement of memory in a data processing system, consistent with embodiments of the disclosure.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

The words "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

One aspect of the present disclosure relates to a system and apparatus for memory management in a data processing system. In some embodiments, a range of virtual memory addresses and a copy of that range are mapped to the same first system address range in the data processing system until an address in the virtual memory address range, or its copy, is written to. The common system address range includes a number of divisions. Responsive to a write request to an address in a division of the common address range, a second system address range is generated. The second system address range is mapped to the same physical addresses as the first system address range, except that the division containing the address to be written to and its corresponding division in the second system address range are mapped to different physical addresses. First layer mapping data, for translating a virtual memory address to a system address, may be stored in a range table buffer and updated when the second system address range is generated. Second layer mapping data, for translating a system address to a physical address in a data resource, may be stored in a system-to-physical translation cache that is updated when shared data is modified. Thus, a two-layer, copy-on write mechanism is provided for a data processing system.

FIG. 1 illustrates a logical arrangement of memory 100 in a data processing system, consistent with embodiments of the disclosure. The memory arrangement includes a virtual memory address space 102. Although a single virtual memory address space 102 is shown in FIG. 1, each program or device sees its own virtual memory address space that contains instructions and data for use by that program or device. Programming threads may share the same virtual memory address space. The use of virtual memory addressing allows memory access to be controlled by inhibiting one program from accessing or corrupting information used by another program. Memory arrangement 100 also includes a system address space 104. The system address space allows access to addressable units in the data processing system, such as memory, storage, hardware accelerators and network interface controllers. The system address space may contain both physical (memory backed) addresses and virtual memory addresses. Memory arrangement 100 also includes a physical address space 106 that contains physical addresses in data resources such a memory devices or storage devices, for example. Data resources 108, 110 and 112 are shown in FIG. 1, but a data processing system may have any number of data resources.

In accordance with embodiments of the disclosure, the one or more virtual memory address spaces are divided into address ranges, such as address range 114 (RANGE A), in FIG. 1. Each range may be defined by two parameters, such as start and end addresses, a start address and an extent (length), or offsets from a reference address, for example.

In accordance with embodiments of the disclosure, each range in the virtual memory address space is mapped to a corresponding range in the system address space. For example, virtual memory address range 114 is mapped to system address range 116. Each system address range is further divided into a number of divisions. In the example shown in FIG. 1, the system address range 116 has four divisions, denoted as D1, D2, D3 and D4. In the sequel, it is assumed that each division corresponds to a page of memory or storage, but other sized divisions may be used without departing from the present disclosure. The mapping is referred to as a first layer mapping and may be recorded and implemented using a range table buffer, for example.

Each division of a system address range is mapped to a page in a data resource. For example, division D1 is mapped to page P1 in data resource 108, division D4 is mapped to page P6 in data resource 110, etc. This mapping is referred to as a second layer mapping and may be recorded and implemented in a system-to-physical translation cache, for example.

When a process or thread requests a copy of virtual memory address range 114, a new virtual memory address range 118 (RANGE B) is created. Original virtual memory address range 114 is referred to as the 'parent' virtual memory address range, while the new virtual memory address range 118 is referred to as the 'child' memory address range. The child range may be in the same virtual memory space 102 or in a different virtual memory space. This operation is referred to as a virtual copy, since no data has been moved in any physical data resource. The child virtual memory address range 118 is mapped to the same system address range 116 as the parent virtual memory address range 114. However, a new mapping (from virtual memory address to system address) is generated for the child range. This is discussed in more detail below.

Operation may continue as long as no data is modified in range 114 or range 118. Thus, copying of the actual data is deferred. However, if data in range 114 or 118 is modified, by a write command for example, a physical copy of the modified data must be made since the data can no longer be shared.

Figure 2:
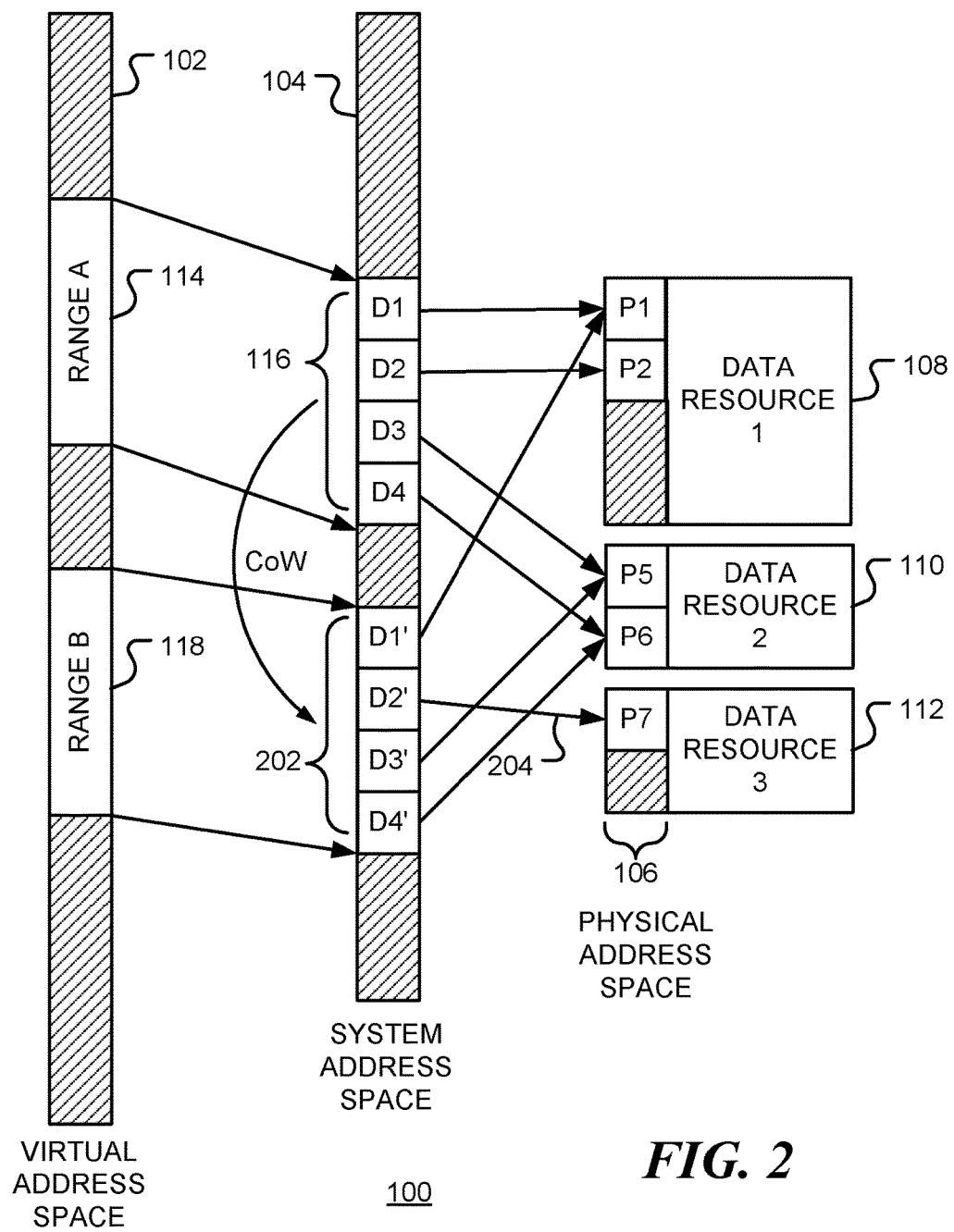
FIG. 2 shows a further logical arrangement of memory, after data in a range has been modified and a physical copy of the data has been made, consistent with embodiments of the disclosure.

FIG. 2 shows memory 100 after data in a range has been modified and a physical copy of the data has been made. In the example shown, it is assumed that a write request was issued for an address in child virtual memory address range 118 and that the address is mapped to division D2 of the system address range. After the write, parent range 114 and child range 118 cannot share division D2, so a two-layer copy is performed. Firstly, a copy 202 of the system address range 116 is made in the system address space 104, and the associated mapping from virtual memory address range 118 to system address range is updated. Copied system address range 202 has four divisions, denoted as D1', D2', D3' and D4', which correspond to the divisions D1, D2, D3 and D4 in system address range 116. After the write (to either division D2 or D2'), data associated with divisions D2 and data associated with division D2' must be stored in different pages. In this example, D2 remains stored in page P2 of data resource 108, while data in the division D2' in the copied range 202 is to be stored in page P7 in data resource 112. A new mapping 204 is generated to indicate how system address range 202 is mapped to physical addresses. Alternatively, data in division D2' could remain stored in page P2 of data resource 108, while data in the division D2 in the original range 116 is stored in page P7 in data resource 112, since a computing device does not need knowledge of the second layer mapping.

In this manner, only a single additional page of physical storage is needed, rather than storage for the complete copied range 202.

An advantage of this approach is that copying of data is deferred until data is actually modified (and may be avoided all together is future accesses are 'read only'). A further advantage is that only modified divisions of the system address range are copied, rather than the complete range, thereby minimizing resource usage. The approach is termed a 'two-layer, copy-on-write' mechanism, since two separated mappings are maintained and updated (those mappings being the virtual to system address mapping defined by the range within the range table and the separate system address to physical page mapping within the memory node controller), and no physical data is copied until a write operation is requested.

In accordance with further aspects of the disclosure, mechanisms are provided for maintaining and updating the mapping from a virtual memory address space to a system address space and the mapping from a system address space to a physical address space. In one embodiment, the mechanisms are provided by a first memory address translation apparatus and a second memory address translation apparatus, respectively. The first address translation apparatus is accessible by one or more computing devices that use one or more virtual memory address spaces, and is configured to translate a virtual memory address in a first range of virtual memory addresses to a system address in a first range of system addresses. The second memory address translation apparatus includes data resource allocation circuitry to allocate resources of one or more data resources, and a system-to-physical address translator, such as a cache, configured to translate a system address in the first range of system addresses to a physical address in the physical address space of a data resource of the one or more data resources. The data processing system is responsive to a copy request for a given virtual memory address in the first (parent) range of virtual memory addresses (114 in FIG. 1) to generate a second (child) range of virtual memory addresses (118 in FIG. 1). Subsequent to the copy request, but prior to a write operation in the parent or child range of virtual memory addresses, the first address translation apparatus is configured to translate both the parent and child ranges of virtual memory addresses to the same range of system addresses, 116.

Referring again to FIG. 2, after a virtual copy, the parent system address range 116 comprises parent divisions D1 . . . D4 and the child system address range 202 comprises corresponding child divisions D1' . . . D4'. Subsequent to a write operation to a system address in a first parent division, the second memory address translation apparatus is configured to allocate space in a data resource for storing a copy of data in the first parent division or the data to be written, update the system-to-physical address translation cache to include the child system address range, and update the system-to-physical address translator cache to map either the first parent division or the corresponding second child division to the allocated space in the data resource. The system-to-physical address translator cache is updated to map the child divisions to the same physical addresses as the parent divisions, except that the first parent division and the corresponding child division are mapped to different physical addresses.

In accordance with certain embodiments of the disclosure, the mappings from virtual memory address space to system address space are maintained using range tables.

In accordance with certain embodiments of the disclosure, the mappings from system address space to physical address space are maintained by memory node controllers as disclosed in co-pending patent application Ser. No. 15/650,008, which is hereby incorporated by reference herein in its entirety.

Figure 3:
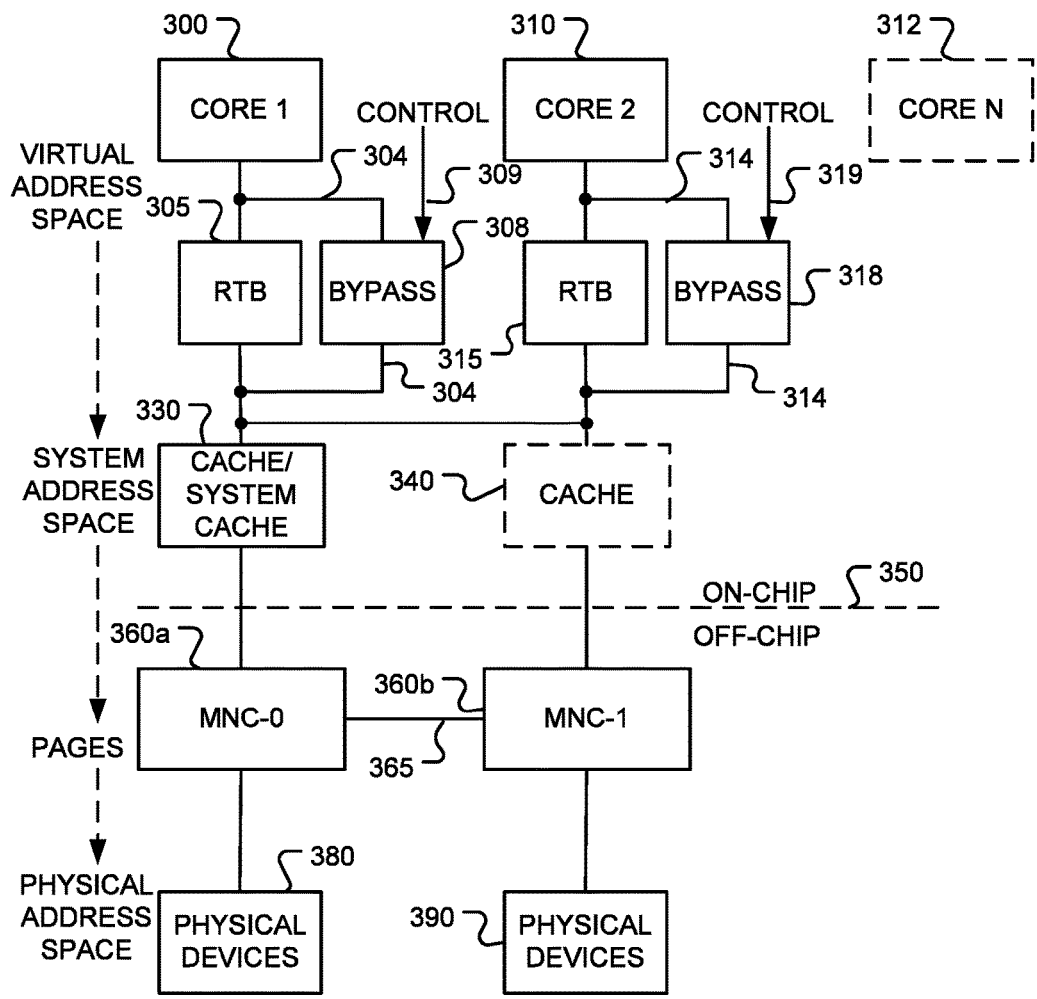
FIG. 3 is a block diagram of a data processing apparatus, consistent with embodiments of the disclosure.

FIG. 3 is a schematic illustration of a data processing apparatus consistent with embodiments of the disclosure. Referring to FIG. 3, the data processing apparatus includes a number of processor cores 300, 310. In the example of FIG. 3, two such processor cores are illustrated, but (as shown schematically by the broken line box 312) more processor cores could be provided. Alternatively, the system could comprise just one processor core.

The processor cores are arranged to process data in accordance with virtual memory addresses. For example, each of the processor cores may process data in accordance with virtual memory addresses in a respective virtual memory address space, for example under the control of an operating system or a so-called hypervisor which allocates virtual memory address spaces to the processes being performed by the different processor cores, partly as a technique for avoiding a process associated with one processor core accidently or maliciously accessing data appropriate to a process being executed by another of the processor cores.

First Layer Memory Address Translation

A memory address translation apparatus is provided to translate between the virtual memory addresses in the virtual memory address space and system addresses.

The system addresses are "output" memory addresses from the first layer translation. A system address could represent a physical address; i.e. an address by which a physical memory device or other addressable unit could be physically addressed. Alternatively, the system addresses could represent addresses that need a further stage of address translation before being used to access a physical memory device or other addressable unit. From the point of view of address translation techniques, these options are equivalent. That is to say, the address translation techniques start with a virtual memory address and produce a system address. A further stage of address translation on the system address is provided by memory controller nodes 360a and 360b.

In FIG. 3, address translation from a virtual memory address to a system (output) address is carried out by a so-called range table buffer (RTB) 305, 315. This performs address translation between a virtual memory address in the virtual memory address space and a system address in the system (output) address space. Each of the processor cores has a respective range table buffer. However, other address translation techniques (from virtual address to system (output) address) may be used, such as a translation look-aside buffer (TLB), for example.

Bypass logic 308, 318 is provided to selectively bypass the RTBs 305, 315 when the address translation is such that a virtual memory address is equal to a corresponding system address. The bypass circuitry or logic is controllable by a control signal 309, 319 which will be discussed below. When the bypass logic is enabled, either the RTBs 305, 315 do not perform any translation, or the translation performed by the RTBs 305, 315 is ignored and the virtual memory address is provided, by a bypass route 304, 314, for use as the output memory address.

Processor cores 300, 310 are implemented or fabricated on an integrated circuit substrate in this example, and may both (or all, in the case of more than two) be provided on the same integrated circuit substrate. These devices are referred to in FIG. 3 as being "on-chip".

Also provided on-chip, is a cache and/or system cache memory 330 to provide a temporary store for a subset of data held by the memory system to be discussed below, such as a most-recently accessed subset and/or a speculatively fetched subset. As shown in FIG. 3, processor cores 300 and 310 share a common cache/system cache 330. However, in other examples more than one cache could be provided, and another cache 340 is shown in broken line to illustrate such an arrangement. A still further embodiment does not use any caches at all The cache/system cache 330 (340) operates according to the system (output) memory addresses generated by the RTBs 305, 315.

Broken line 350 indicates a logical boundary between on-chip devices and off-chip devices, although it will be appreciated that this is just an example and that the implementation of any of the modules shown in FIG. 3 on the same integrated circuit or as different circuitries is a matter for a system designer. Thus, FIG. 3 represents a schematic example of how the separation of on-chip and off-chip components might be achieved in one embodiment. In a further embodiment, the components may be implemented as a single chip. Some or all of the modules shown in FIG. 3 could be implemented using multiple chips that are tied together by an interposer in a packaged device.

Memory Node Controller

Off-chip, one or more memory node controllers 360a, 360b are provided, which in turn access one or more respective physical devices 380, 390 such as random access memories (DRAMs), Phase-Change memories (PCMs), High Bandwidth Memories (HBMs) or block based storage devices such as a Solid State Drive (SSD), for example. Given that the physical devices 380, 390 operate in a physical address space, functions of the memory node controllers 360a, 360b can include: (a) translation of system (output) memory addresses to physical memory addresses (or to block address through an appropriate protocol such as a Serial Advanced Technology Attachment (SATA) protocol for example), if a further stage of translation is needed, and (b) management of which of the physical devices 380, 390 need to be accessed in order to implement a required memory access operation.

The translation operation (a) mentioned above is a second layer address translation and can be carried out either using the techniques to be discussed below, or by a known memory address translation technique. The management operation (b), to manage which of the physical devices 380, 390 should be accessed, can be carried out using, for example, a table or directory stored at one or more of the memory node controllers 360a, 360b to indicate a partitioning of the physical address space between physical devices and, in turn, memory node controllers.

In the example of FIG. 3, two memory node controllers are provided. The system address space is partitioned between the two memory node controllers. If one of the memory node controllers (such as a the memory node controller 360a) receives a request for a memory access transaction which relates to an address handled by another memory node controller such as the memory node controller 360b, the first memory node controller 360a can communicate via a data connection 365 with the other memory node controller 360b, passing on the system address relating to that transaction and requesting that the transaction be carried out by the second memory node controller 360b.

The embodiment shown in FIG. 3 includes one or more memory node controllers (MNCs). A MNC provides a dedicated hardware mechanism to collect and use metadata, including performance statistics such as re-use distance. The metadata is used to provide better placement of memory pages in the available technology.

As described above, a MNC maps at least a partition of the system address space of a data processing system to physical device memory space. The MNC provides a mapping function from the system address space to a physical space in a resource such as, for example, a DRAM device, a block device, a remote direct memory access (RDMA) appliance, or memory located on a hardware accelerator. An RDMA appliance may be any memory or storage device used for remote memory access. The MNC provides functionality for writing to a system address, maintaining page level ownership across a memory fabric, optimally placing pages in memory via metadata tracking, and the feeding forward of data to a fast on-chip memory. The MNC is implemented in hardware and may be part of an integrated circuit having additional functions. The MNC may be synthesized from a netlist or hardware description language (HDL) representation, for example.

In accordance with certain embodiments, a MNC provides a single abstraction of resources such as storage, memory, or a network interface controller (NIC) into a single system address space.

In accordance with certain embodiments, a MNC provides a means to treat memory at the MNC page level as "shareable" between multiple MNC(s).

In accordance with certain embodiments, a MNC provides a second layer of a Copy-on-Write apparatus.

In accordance with certain embodiments, a MNC provides an efficient means to perform a single copy operation.

This may be provided, for example, to all levels of an accelerator device and may be provided via a network interface controller (NIC).

In accordance with certain embodiments, a MNC is part of a memory fabric configured following a memory server model, where the memory fabric services memory requests from various local or remote computing devices of a data processing system.

Figure 4:
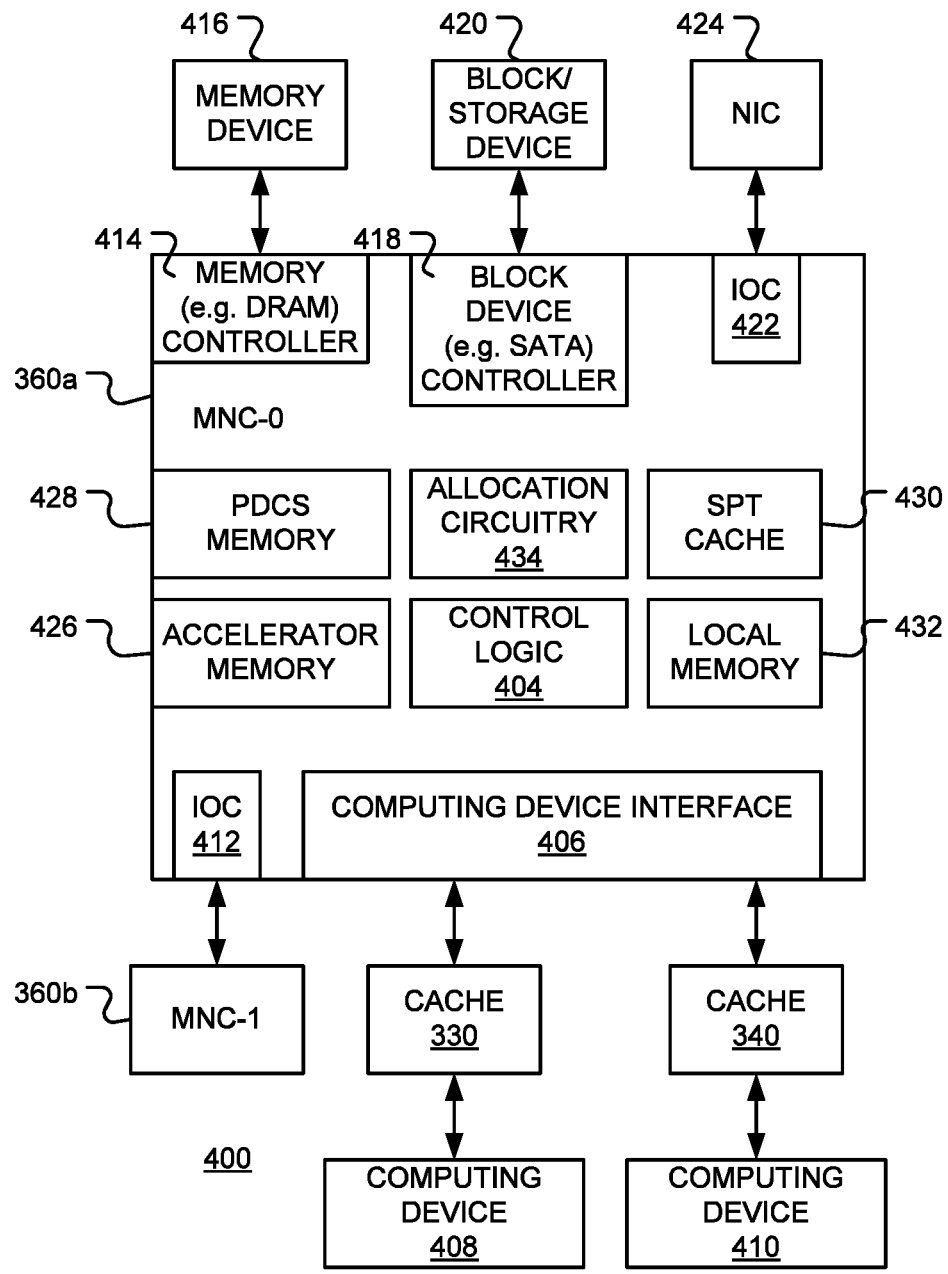
FIG. 4 is a further block diagram of a data processing system, consistent with embodiments of the disclosure.

FIG. 4 is a block diagram of a data processing system 400 consistent with embodiments of the disclosure. Data processing system 400 includes first memory node controller (MNC 0) 360 and, optionally, one or more second memory node controllers such as MCN 1 370. MNC 360 includes control logic 404 that is coupled to number of other functional blocks. System 400 is configured as network in which MNCs 360a and 360b provide network nodes that interconnect computing devices, such as 408 and 410. A computing device may be a processing core, a cluster of processing cores, a hardware accelerator or other device that consumes data.

Device interface 406 enables MNC 360 to interact with multiple computing devices 408 and 410 and other devices such as hardware accelerators. A computing device may be on-chip or off-chip. System 400 is configured as network in which MNCs 360a and 360b provide network nodes that interconnect computing devices, such as 408 and 410, with memory resources. In one embodiment, device interface 406 is compliant with the 'Peripheral Component interconnect Express' (PCIe) standard. PCIe is a non-proprietary standard for interconnecting internal devices in a computer. For example, device interface 406 may include a PCIe root complex that enables connection with multiple computer elements or virtualized PCIe devices. When multiple MNC nodes are used, the node is 'multi-roof' in the PCIe standard. However, an MNC can also support single root virtualization for guest operating systems for backwards compatibility. Devices on MNC network are recognized via a virtualized hardware mediated PCI device tree.

IO Controller

MNC 360 also includes IO Controller (IOC) 412. IOC 412 is a generic interconnect or bus that enables connection to off-chip components. This may be a custom physical layer with a protocol that enables response to or transport of commands. The commands may be instruction set architecture (ISA) level memory instructions, for example. IOC 412 may operate under a standard structure such as a PCIe-v4 structure, for example. Other physical layers could be used depending on the characteristics required by the MNC and overall system. IOC 412 enables communication with other MNC devices.

Memory Controller

MNC 360 also includes memory/storage components such as memory controller 414 (such as one or more DRAM controllers) that enables coupling with memory device 416, block device controller 418 (such as a SATA controller, for example) for coupling with block devices 420. Each device is mapped to a physical range of memory that can be virtualized further by the MNC itself, or an operating system.

Additional IO Controller 422 enables connection to a device such as network interface controller 424.

In the embodiment shown in FIG. 4, MNC 360 also includes accelerator physical memory 426, fast local memory 432 (such as combined DRAM/NV 3-D integrated memory, for example) for use as local buffer for data re-arrangement, compute in memory and for NIC and RDMA transactions.

MNC 360 also includes data resource allocation circuitry 434 to allocate resources of the one or more data resources (such as 416, 420, or a network device accessible via NIC 424).

Physical Device Configuration Setup (PDSC) Memory

Configuration data is stored in Physical Device Configuration Setup (PDSC) memory 428. For example, the mapping of accelerator physical memory 426 through system address space may be stored in PDCS memory 428. The physical device configuration information is provided to the MNC either via firmware interface, on board non-volatile memory (such as SPI-flash or equivalent), small persistent removable storage (such as a microSD card), or any other method that can transmit information for physical mapping configurations and other configurations such as channel and interrupt assignments. Physical devices, such as SATA, PCIe, SSD, DRAM, and others, are mapped from virtual system address ranges to the physical device ranges.

In one embodiment, the PDSC memory stores information that tells the MNC about devices present on the network, this enables devices to "map" each other virtually from memory space specified into their operating systems and file systems.

Information relating to storage devices is slightly different, and tells the MNC what devices are attached, their characteristics, and what bus lanes or channels they are to be assigned. In addition, for PCIe accelerators, other configuration data might need to be provided as well as the system address mapping of that accelerator device so it can be mapped into the system address space of the host operating system for virtualization.

In summary, the configuration information in the PDSC memory provides the MNC with the information it needs to actuate external devices and map devices such as accelerators, computing devices and network interface controllers, into the system address space to enable virtualization. This information may supplement or replace a traditional device configuration within a kernel.

Other memory node controllers can easily be discovered through handshake at startup, but they could also be specified directly within the configuration information.

In addition to configuration information, self-discovery of other devices may be used. For example, current draw from a block device (e.g., over a SATA connector) could indicate a device and automatically trigger a device identification process.

System-to-Physical Translation (STP) Cache Structure.

The memory node controller includes address translation circuitry. In the embodiment shown in FIG. 4, the address translation circuitry comprises a system-to-physical Translation (STP) Cache structure 430 that holds the translation structure that maps the system addresses to physical pages on various devices. An example implementation of this structure is a sparse hash map with the most frequently used N translations resident in static random access memory (SRAM), with overflow moving to DRAM allocated by the MNC memory controller 414 through the STP cache. In some embodiments, the SRAM in the STP cache may be large enough to store most address translations. In one embodiment translation from system address to physical address may be performed via a hash map and, in some hash map implementations, can be performed on a single clock cycle edge.

Caches

Caches 330 and 340 may be near-edge-of-network data caches to facilitate data transfer to and from MNC 360. These are termed data delivery caches (DDC) and may be located on-chip. Within MNC 360, memory is broken into pages that represent a specific quanta of memory (e.g., 4K regions), which can be placed on any type of physical device. Breaking the larger ranges into smaller pages enables improved memory technology placement and provides an upper limit for metadata collection, since data only needs to be kept at page granularity. The metadata enables memory node controller 360 to place physical pages on the most optimal memory/storage technology (based on some cost function) and, in addition, use a 'feed-forward' approach to page placement to on-chip caches. In a feed-forward approach, the MNC feeds pages of data (at some granularity) optimal for the core and application (i.e., based on bandwidth requirements, re-use distance, etc.) to high bandwidth/low latency memory on the core right where it is needed.

Within the MNC, there are multiple data structures that could be used in hardware to store paging information. In one embodiment, a sparse hash map structure is used, which may be implemented as a tree structure, for example. On a write operation to a page that has no physical backing, the backing is created in a class of memory chosen by an optimization function (likely first in DRAM as an example), however, it could easily create a new dirty page in a non-volatile media. On read operations, a similar thing occurs. The operations may be performed on a page by page basis, where a page is a subset of a range at some granularity (4K, for example). In this way, range translation is provided and pages are striped/placed on the most efficient memory technology. Each page can be put anywhere in the memory network by the MNC without the core having to make any change or take any action.

Since data may be shared between computer devices, a coherency protocol may be used to prevent access to memory pages containing out-of-date data. To this end, the limited directory structure may be used to store the state of data pages.

Each MNC is assigned a partition of the complete system address space at start-up or during a renegotiation process. An example system address range of a partition may be: (base_address+0)→(base_address+n). This partition is further subdivided behind the MNC into physical addresses (or network addresses in the case of a NIC). The MNC controls access to all resources behind it that are capable of storing data, and maps the system address space to physical or network addresses in those resource. File systems and networking functionality may also be mapped onto this address space. Accelerators with on-board memory are also mapped into this address space and may be accessible through an interface from their virtual memory address space, without needing knowledge of the system address space.

Starting on a processor core, a virtual memory address in a request is translated to an address in the system address space using a range translation buffer (RTB) or a translation look-aside buffer (TLB). The request is then sent to the memory node controller.

In first embodiment, the memory space is divided between the MNCs, so that there is a fixed static mapping after boot. This approach has the advantage of being fast, for the routing calculation, and always going to the correct node. However, this approach may not be optimal for on-chip routing or for optimizing memory placement. One reason that the fixed calculation is sub-optimal is that it increases on-chip memory traffic, which could otherwise be used for core-to-core (or thread-to-thread) communication. Another reason is that the overhead needed to support on-chip cluster locality with N cores is $\log_2(N)$ with each memory request. Requests would be tagged to indicate their origin, and then transmitted to the MNC. This approach may be used, for example, when simplicity is more important than overhead.

In a further embodiment, it is assumed that there will be N cores per K MNC(s), and that these N cores will be clustered, as opposed to being in fully connected mesh. In this approach, the routing path is from the cluster through one or more caches (include any DDC) and then to the off-chip interconnect controller associated with that cluster. This interconnect may utilize a PCIe or other physical layer, for example. MNCs are each assigned a static partition of the system address space. This may be done after boot configuration or system reset, to facilitate hot adding/removing/swapping of storage/memory. At the MNC, the system address partition is further subdivided into pages which are either zero allocated (for initial allocation) or point to physical memory on some device. The advantage of this routing path is that the origin of the requests is implicit in the traffic source. For example, it is known which core cluster created the traffic implicitly, without further information or meta-data. Capturing and recording the originating core would otherwise require at least enough bits to encode the number of clusters within the node with each memory request. Using the locality information, the MNC network can migrate the pages (that are indexed using the system address) within the network, or check them out from the owner of the system address range if the compute patterns warrant it.

Efficient use of this infrastructure is facilitated by software awareness. Given that the system address space is split between N MNCs, and these MNCs are connected to computing devices based on, for example, physical locality, tasks can be scheduled such that they are executed on computing devices connected to an MNC that controls the system and physical memory already allocated, or at least to a nearby MNC. This ensures low latency communications.

Figure 5:
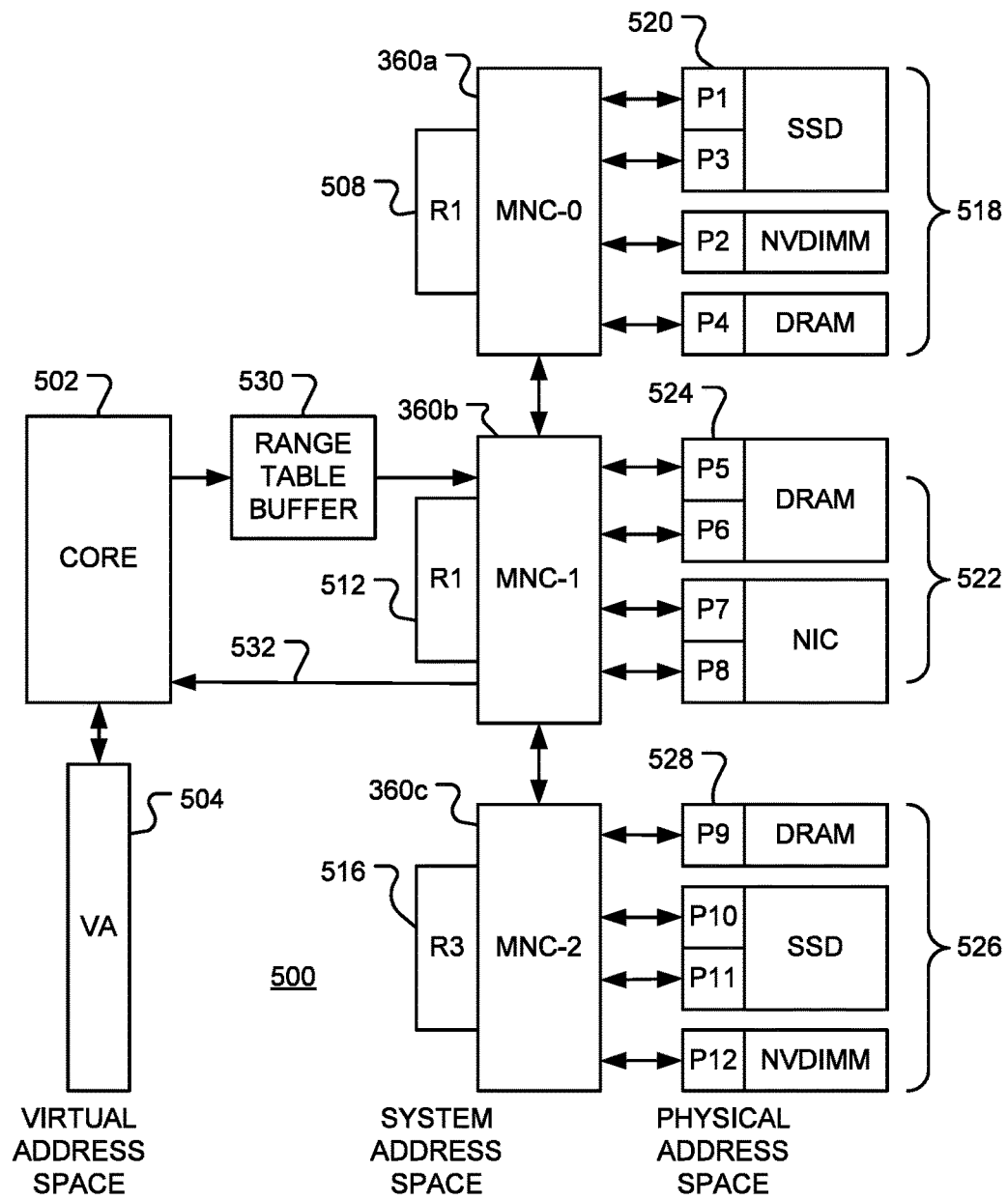
FIG. 5 is a still further block diagram of a data processing system, consistent with embodiments of the disclosure.

FIG. 5 is a block diagram of a data processing system 500 consistent with embodiments of the disclosure. Data processing system 500 includes a core or computing device 502 that operates in a virtual memory space 504. In the embodiment shown, the system address space is divided into three partitions, R1, R2 and R3. System 500 also includes MNC 506 that is associated with system memory partition 508 (R1), MNC 360a that is associated with system memory partition 360b (R2), and MNC 360c that is associated with system memory partition 516 (R3). MNC 506 controls access to memory resources 518, that store pages 520 having physical addresses P1, P2, P3 and P4 in this example. MNC 506 translates a system address in the partition R1 to a physical address in the memory resources 518. Similarly, MNC 360a controls access to memory resources 522, that store pages 524 having physical addresses P5, P6, P7 and P8 in this example. MNC 360a translates a system address in the partition R2 to a physical address in the memory resources 522. MNC 360c controls access to memory resources 526, that store pages 528 having physical addresses P9, P10, P11 and P12 in this example. MNC 360c translates a system address in the partition R3 to a physical address in the memory resources 526. In this way, a 64K address space is split into four 16K ranges and each 16K range is split into four 4K pages that are allocated between the physical resources.

When core 502 issues a request to access data at a virtual memory address in space 504, the virtual memory address is translated to a system address in range table buffer 530. If the address is not found in a local cache, the system address is passed to the MNC coupled to core 502. In this example, the system address is passed to MNC-1 (360*a*). MNC-1 (360*a*) determines if the system address is in the partition R2. If it is, the corresponding memory resource of 522 is identified together with the physical address in that memory resource, and data at the physical address is accessed. A memory write access may be acknowledged over link 532. Data read from the memory resource is returned over link 532.

If the system address is not in the partition R2, the MNC that the controls the partition is identified and the request is forwarded to the identified MNC where the request is serviced. Any response to request is returned to the core 502 via link 532.

In certain embodiments, translation within the MNC between a system address and a physical address is made using a data structure stored in System-to-physical Translation (STP) cache (430 in FIG. 4, for example). The data structure may be a table that uses a masking hash lookup of a page entry. For example, the page number may be computed a logical AND operation between the system address and the page size as a power of two. An example page entry in the RTP cache may contain the information shown in TABLE 1.

TABLE 1

| system address base | device ID | physical or block start (depending on previous field) | Current Location/ MESI status |
|---|---|---|---|
| 0 | ssd_zero | 0xff, 0x10f | |

In one embodiment, three pointers are used to support copy on write, one to the entry which is the current clean physical copy (the head), one that is the parent and one that is the child. This enables the update process to be optimized. Other variations will apparent to those skilled in the art.

Memory allocation may be efficiently handled through use of a buddy memory allocation scheme or other scheme that may be represented, for example, by a sparse tree. Compaction of system address ranges (re-ordering) can be accomplished, for example, by signaling the OS to find the processing threads that contain a system address and then changing out the system address ranges. This process can be time consuming. However, for a large system address space (such as 64-bits) this is unlikely happen unless current systems become very much larger. Alternatively, another layer of indirection may be between the system layer and the physical layer so that the space can be compacted or shuffled without disrupting any of the system addresses.

Page information is stored in memory. In the simplest implementation of the hardware, an entry is used for each page. For example, if a single MNC is assigned a 100 TB address partition and if the page size is selected to be 2 MB, the table would fit into a small 64 MB SRAM structure even if the device was entirely full. Additional space is required if other metadata is to be stored. However, in one embodiment, the size of the table is reduced by compressing empty pages into a zero page range.

A copy-on-write (CoW) mechanism may be implemented in a virtual memory system to reduce the amount of duplicate data in the system. On a copy from a range of memory (referred to as the parent), the now copied range (referred to as the child) still points to the system addresses (physically-backed or not) used by the parent, as discussed above with respect to FIG. 1. For the first layer of CoW, the only thing that is copied for the CoW is the metadata that describes the range itself, with the offset modified. This action can be performed in hardware or mediated via a systems software layer. In the embodiment described below, it is assumed that this action is hardware mediated, although some additional actions, such as a check of user limits on an executing program, may be performed by the operating system. The copied range still points to the parent range memory, however, it is mapped into a new process's virtual memory address space. This means that the copied range maps to the same system address and is able to alias memory from the parent range as is desired until a write occurs. This results in better cache utilization and more efficient memory usage.

Figure 6:
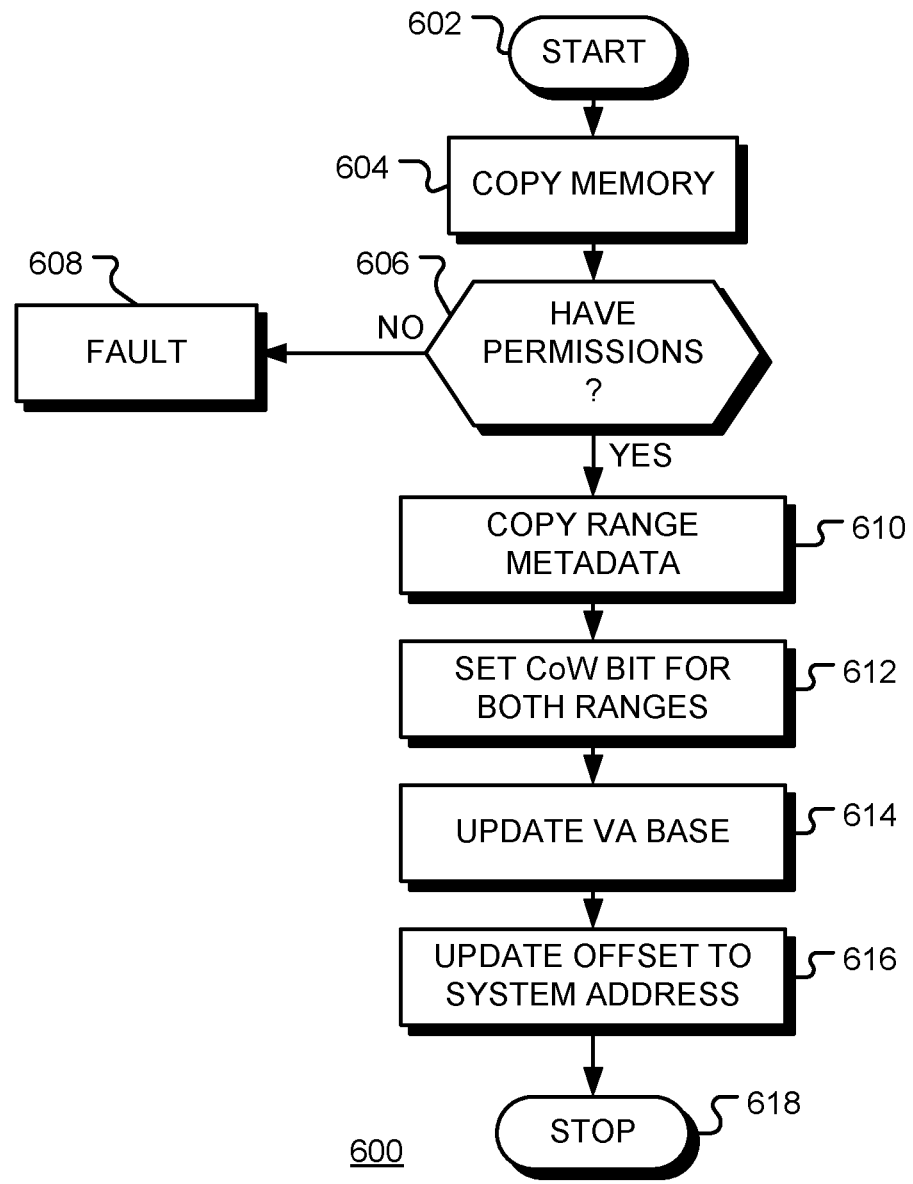
FIG. 6 is a flow chart of a method for performing a copy operation in a data processing system, consistent with embodiments of the disclosure.

FIG. 6 is a flow chart of a method 600 for performing a copy operation in a data processing system, consistent with embodiments of the disclosure. Following start block 602, an instruction to copy memory at a virtual memory address is issued by a device at block 604. The address is looked up in the range table of the device (the parent range table). If the table indicates that it is not permitted to copy the data at the address, as indicated by the negative branch from decision block 606, a fault condition is entered at block 608. If the copy is permitted, as indicated by the positive branch from decision block 606, the metadata for the address range that includes the virtual memory address to be copied is written as a new entry in the child range table at block 610. The child range table may be the parent range table itself or another range table, such as a range table of another device. After a copy, a CoW status indicator is set, at block 612, in entries in both the parent and child range tables (as shown in FIG. 7, discussed below) to indicate that the address range is part of a CoW operation and the data is currently in shared state. In the sequel, the CoW status indicator is referred to as a single CoW status bit, but other indicators may be used. The address ranges may have any size, and can be extremely large, but at some granularity. At block 614, the metadata in the child range table is modified to indicate a new range of virtual memory addresses. For example, the virtual memory address range may be indicated by a base address and an extent or a start address and an end address. At block 616, the metadata in the child range table is modified, if necessary, to indicate that the new range of virtual memory addresses corresponds to the same range of system addresses as the original virtual memory address range. Thus, both the original (parent) and copied (child) virtual memory addresses correspond to the same system range and the same physical memory locations, so the process is referred to as a virtual copy. The virtual copy is now complete, as indicated by termination block 618. It is noted the order of operations may be changed, and that multiple operations may be combined into a single operation. It is also noted that no physical memory has been updated.

The first memory translation apparatus may include at least one range table buffer to store translation data in one or more entries. The data stored in an entry are indicative of address range boundary values defining a range of virtual memory addresses between respective virtual memory address boundaries in a virtual memory address space, a translation between a virtual memory address in the range of virtual memory addresses and a corresponding system address in a system address space and a copy-on-write status.

FIG. 7 illustrates range table entries in two-layer copy-on-write mechanism, consistent with embodiments of the disclosure. Parent range table entries 700 show the contents of a single range table entry in parent range table A at different times. In the embodiment shown, the address range boundary values in parent range table entry 700 include a virtual memory address base value 702 (VA_BASE) and a virtual address extent 704, (VA_EXTENT). These indicate an address range from VA_BASE to VA_BASE+VA_EXTENT. Field 706 contains an offset that, when added to a virtual memory address, indicates the system address corresponding to the virtual memory address. Thus, the offset value is used to translate a virtual memory address to a system address. The range table entry 700 also includes a permissions field 708, which may contain memory access permission, a CoW field 710, or other administrative data (such as forward and backward pointers to parent and child CoW ranges in the system address space as an optimization for locating the parent and child ranges or criticality bits for error protection, data could also indicate a range devoid of writes which when read returns zero without accessing memory system past the RTB).

Before any copy takes place, the corresponding entry 712 in the child range table (table A-COPY) is empty. The entry contains fields 714, 716, 718, 720 and 722 that correspond with fields 702, 704, 706, 708 and 710, respectively, of the entry in the parent range table A.

When a copy instruction is issued, the parent entry 700 is copied into the child entry 712 at COPY STEP 1. At COPY STEP 2, the CoW field is set in field 710 of entry 700 and in field 722 in entry 712 to indicate that the corresponding data is shared between two virtual memory address ranges. This is denoted as 'C' in fields 710 and 722. At COPY STEP 3, a new virtual address base (NEW VA_BASE) is written to field 714 in entry 712 and a new offset is written to field 718. The new virtual address base and new offset are related such that the new virtual address range maps to the same system address range as before, so data is shared between the original virtual address range and the new virtual address range.

The shared state condition can be set until interrupted by a write to either the parent or the child virtual memory address range. When that happens, the range that made the write initiates a HW-driven clone operation (through the memory storm interface). This clone operation takes in the base system address and range (all available to the hardware) and returns a new system address and range. In the case that the data was written by the device using the child range, the offset value in field 718 is updated to reflect the new system range, as depicted in the WRITE STEP 1 in FIG. 7. If the data was written to the device using the parent range table, the field 706 would be updated instead of the field 718.

In WRITE STEP 2, after the write, both the parent and child ranges' CoW status indicators are changed to indicate non-CoW, i.e. that the corresponding data is not shared (in one embodiment a range entry can be linked via pointers in the range's administrative data to quickly identify the pointed-to CoW range's parent and child if present). Any further CoW behavior is transparently handled within the memory node controller (MNC) itself.

In the first layer copy-on-write, the new system range is generated. In the second layer copy-on-write, a new mapping from system to physical addresses is generated, but only the written-to physical pages are actually copied. The remaining pages still map to the physical pages of the parent range (until they too written to). As discussed above, each system range is subdivided into physical pages whose metadata (such as actual location, empty/allocated, etc.) is represented within an efficient data structure. The data structure may be a B-Tree or other self-balancing search tree, for example. Upon receiving a copy operation, a new set of pages is set up so that they initially point to the parent range's pages. Upon receiving a write (to a real address), the page that it falls into is calculated (e.g., using a hash), and the page is checked to see if it has a CoW status bit set (within the hardware data structure mapping physical pages, again, e.g., a B-Tree). If the CoW status bit is set, the write is buffered, then a new physical page is allocated (on one of the available memory technologies, such as DRAM/NV/SSD/etc.) and the page is copied. Once copied the buffered write is committed to the copied page. Optionally, the metadata for the page may be copied.

Read accesses to memory are often more frequent than write accesses. Therefore, keeping the initial step on the core itself (for example by copying the range table entry and setting a bit) significantly speeds up the critical path of the copy or clone operation. Moving the actual physical copying of memory to the memory fabric enables the OS and core to continue on computing, moving the slow write operation off the critical path. Another significant advantage of this mechanism is that it enables accelerators to use the same CoW mechanism. This is not possible with prior systems. An accelerator can have a cloned memory range passed to it and, transparently, the memory fabric can utilize the second level of CoW to write to distinct pages from the parent range, thus reducing copy overhead and data movement.

Figure 8:
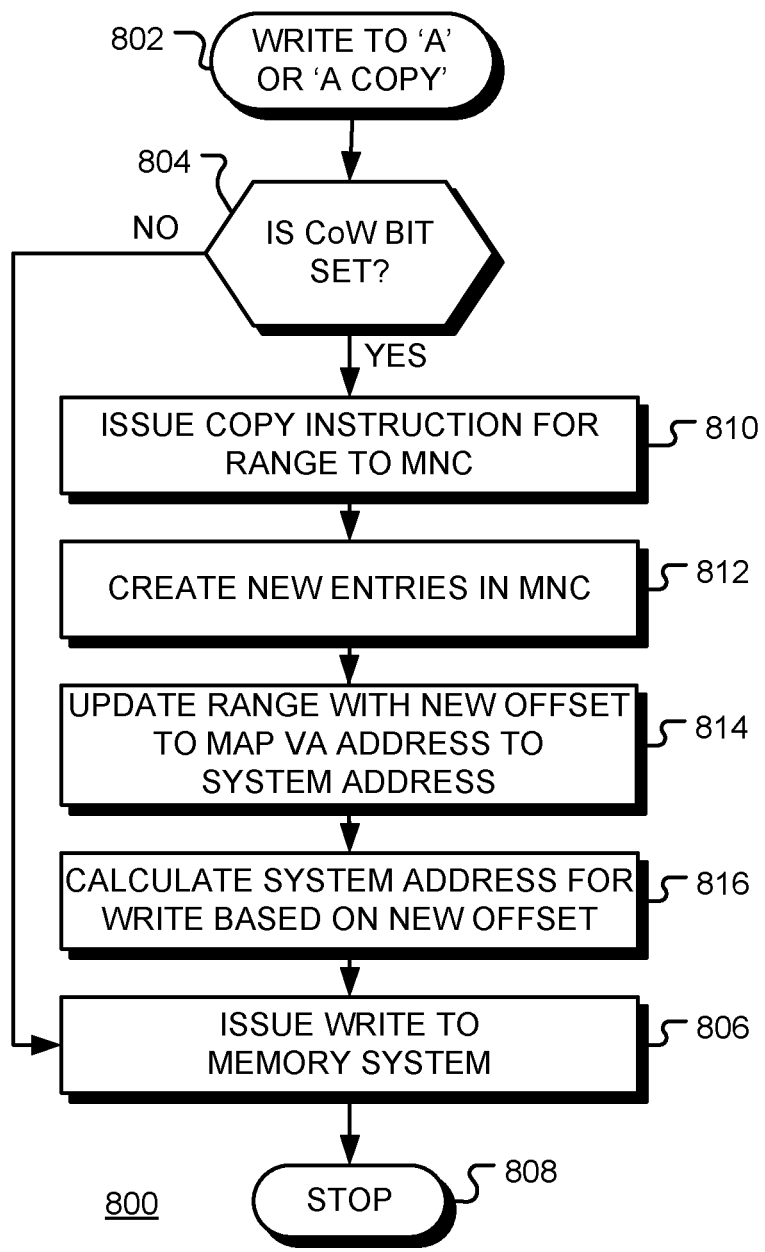
FIG. 8 is a flow chart of a method for performing a write operation in data processing system, consistent with embodiments of the disclosure.

FIG. 8 is a flow chart of a method 800 for handling a write operation in data processing system.

Following a write instruction to a virtual memory address at start block 802, the address is looked up in the range table to determine if the CoW status bit in the corresponding entry is set. If the CoW status bit is not set, as depicted by the negative branch from decision block 804, the memory is not shared, so the write instruction is issued to the memory system at block 806 and the process terminates at block 808. However, if the CoW status bit is set in the range table entry, as depicted by the positive branch from decision block 804, a copy request is issued, at block 810, to the memory node controller (MNC) associated with the range containing the system address to be written. At block 812, the MNC creates a new system range and updates its system-to-physical translation table to map the new system range to physical addresses. The MNC also allocates new physical storage and copies, to the allocated storage, the division or page that containing the address to be written to. At block 814, the offset and virtual memory address base are updated in the range table of the device that issued the write request and the CoW status bit is cleared. At block 816, the virtual memory address to be written is translated to a system address using the new offset in the range table. Finally, a corresponding write instruction is issued to the memory system at block 806.

Inside the MNC, the page to which the write is directed is calculated, the page is then allocated new physical memory, and copied. This operation may be performed at the memory controller level off-chip, and can take advantage of in-technology copy techniques such as buffer-buffer copy and in-SSD copy, for example. Once copied, the write is submitted to the new page. All the other pages still point to the parent pages as they are "clean" and exactly the same as the parent pages. In this way, the second layer of copy-on-write provides the same or better performance than a standard copy-on-write system given that the main processing core does not have direct participation. At this point the two layer "fast" copy-on-write process is complete and the process terminates at block 808.

The various embodiments and examples of the present disclosure as presented herein are understood to be illustrative of the present disclosure and not restrictive thereof and are non-limiting with respect to the scope of the present disclosure.

Further particular and preferred aspects of the present disclosure are set out in the accompanying independent and dependent claims. Features of the dependent claims may be combined with features of the independent claims as appropriate, and in combinations other than those explicitly set out in the claims.

Components of the data processing system may be implemented in an integrated circuit. The circuit may be defined be a set of instructions of a Hardware Description Language (HDL) instructions, which may be stored in a non-transient computer readable medium, for example. The instructions may be distributed via the computer readable medium or via other means such as a wired or wireless network. The instructions may be used to control manufacture or design of the integrated circuit, and may be combined with other instructions.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

Accordingly, some features of the disclosed embodiments are set out in the following numbered items:

1. A data processing system comprising: a first memory address translation apparatus, accessible by one or more computing devices and configured to translate one or more virtual memory addresses in a first range of virtual memory addresses to one or more system addresses in a first range of system addresses; and a second memory address translation apparatus comprising: data resource allocation circuitry to allocate one or more data resources; and a system-to-physical address translator, configured to translate one or more system addresses in the first range of system addresses to a physical address in the physical address space of a data resource of the one or more data resources, where the data processing system is responsive to a copy request for a virtual memory address in the first range of virtual memory addresses to generate a second range of virtual memory addresses, and where, subsequent to the copy request and prior to a write operation in the first or second range of virtual memory addresses, the first address translation apparatus is configured to translate both the first and second ranges of virtual memory addresses to the first range of system addresses.

2. The data processing apparatus of item 1, where the first range of system addresses comprises a first plurality of divisions and where, subsequent to a write operation to a system address in a first division of the first plurality of divisions, the second memory address translation apparatus is configured to: allocate space in a data resource of the one or more data resources; copy data associated with the first division to the allocated space; update the system-to-physical address translator to include a second range of system addresses, where the second range of system addresses comprises a second plurality of divisions corresponding to the first plurality of divisions and includes a second division corresponding to the first division; update the system-to-physical address translator to map either first division or the second division to the allocated space in the data resource; and update the system-to-physical address translator to map the second plurality of divisions to the same physical addresses as the first plurality of divisions, except that the first division and the corresponding second division are mapped to different physical addresses.

3. The data processing system of item 2, where the first plurality of divisions comprises physical memory pages.

4. The data processing system of item 2, where the first plurality of divisions comprises memory blocks from a block storage device.

5. The data processing system of item 1, where the first memory translation apparatus comprises at least one range table buffer to store translation data in one or more entries, where data stored in an entry are indicative of: address range boundary values defining a range of virtual memory addresses between respective virtual memory address boundaries in a virtual memory address space; a translation between a virtual memory address in the range of virtual memory addresses and a corresponding system address in a system address space; and a copy-on-write status.

6. The data processing system of item 5, in which the translation is indicated by an address offset between a virtual memory address and a corresponding system address.

7. The data processing system of item 5, where generating the second range of virtual memory addresses comprises: detecting a first entry in a range table buffer of the at least one range table buffers for which the range of virtual memory addresses defined by translation data of the first entry includes the given virtual memory address of the copy request; writing a second entry to a range table buffer of the at least one range table buffer, the second entry indicative of new address range boundary values defining the second range of virtual memory addresses and indicative a new translation between a virtual memory address in the second range of virtual memory addresses and a corresponding system address in first system address range; and updating a copy-on-write (CoW) status indicator in the first entry and the second entry to indicate a shared first range of system addresses.

8. The data processing system of item 7, where the first and second entries are stored in the same range table buffer.

9. The data processing system of item 7, where the first and second entries are stored in the different range table buffers.

10. A non-transient computer readable medium comprising instructions of a hardware description language representative of the data processing system of item 1.

11. A non-transient computer readable medium comprising a netlist representative of the data processing system of item 1.

12. A method for performing a two-layer, copy-on-write operation in a data processing system, the method comprising: assigning a first mapping that maps between a first range of virtual memory addresses in a virtual memory address space of a computing device and a first range of system addresses, where the first range of system addresses comprises a plurality of divisions; assigning a second mapping that maps between the first range of system addresses and first physical addresses in one or more data resources; on receiving a copy request for a virtual memory address in the first range of virtual memory addresses: assigning a third mapping between a second range of virtual memory addresses and the first range of system addresses; on receiving a request to write data to a first system address in the first range of system addresses: determining a first division of the plurality of divisions that contains the first system address; allocating space in the one or more data resources to store a copy of data associated with the determined first division; copying data associated with the determined first division to the allocated space; assigning a fourth mapping between a second range of system addresses and the first physical addresses in the one or more data resources, where the second range of system addresses includes a second division corresponding to the first division; when the write request is associated with a virtual memory address in the first range of virtual memory addresses: updating the first mapping to map the first range of virtual memory addresses to the second range of system addresses; and updating the second mapping to map the first division to the allocated space in the one or more data resources; when the write request is associated with a virtual memory address in the second range of virtual memory addresses: updating the third mapping to map the second range of virtual memory addresses to the second range of system addresses; and updating the fourth mapping to map the second division to the allocated space in the one or more data resources; translating the virtual address of the data to be written to a second system address; and writing the data to be written to the second system address.

13. The method of item 12, where translation data indicative of the first mapping between the first range of virtual memory addresses and the first range of system addresses is stored in a first entry of a range table buffer and translation data indicative of the second mapping between the second range of virtual memory addresses and the first range of system addresses is stored in a second entry of a range table buffer, the method further comprising: on receiving a copy request for a virtual memory address in the first range of virtual memory addresses, setting a copy-on-write (CoW) status indicator in each of the first and second entries to indicate a shared range of system addresses.

14. The method of item 12, where translation data indicative of the first mapping between the first range of virtual memory addresses and the first range of system addresses is stored in a first entry of a range table buffer and translation data indicative of the second mapping between the second range of virtual memory addresses and the first range of system addresses is stored in a second entry of a range table buffer, the method further comprising: on writing the data to the allocated space in the one or more data resources, clearing a copy-on-write bit in the first and second entries to indicate that range of system addresses is not shared.

15. The method of item 12, where translation data indicative of the first mapping between the first range of virtual memory addresses and the first range of system addresses is stored in a first entry of a range table buffer, where data stored in the entry are indicative of: address range boundary values defining the first range of virtual memory addresses; an offset between a virtual memory address in the first range of virtual memory addresses and a corresponding system address in the first range of system addresses; and a copy-on-write status, that indicates whether data in the first range of virtual memory addresses is shared with a second range of virtual memory addresses, where assigning the third mapping between the second range of virtual memory addresses and the first range of system addresses comprises: copying the first entry to a second entry; and updating at least one range boundary value and the offset such that virtual memory addresses in the second range of virtual memory addresses map to first range of system addresses.

16. The method of item 12, further comprising mapping, by a range table buffer associated with a computing device of the data processing system, a virtual memory address in the first range of virtual memory addresses to a system address in the first range of system addresses.

17. The method of item 12, further comprising mapping, by a system-to-physical address translator, a system address in the first range of system addresses to a first physical address in the one or more data resources.

18. A method for performing a write operation in a data processing system, the method comprising: responsive to a request to write data to a first virtual memory address in a range of virtual memory addresses: locating an entry associated with the range of virtual memory addresses in a range table buffer; when a copy-on-write (CoW) status indicator in the located entry indicates that the range of virtual memory addresses is not shared: translating the first virtual memory address to a first system address in a first system address range using a first mapping from virtual memory addresses in the range of virtual memory addresses to system addresses, where the first mapping uses translation data in the entry; and issuing a write instruction for the first system address to a memory system of the data processing system; and when a copy-on-write status indicator in the located entry indicates that the range of virtual memory addresses is shared: requesting, from the memory system, an update to the first mapping to provide a second mapping that maps virtual memory addresses in the range of virtual memory addresses to system addresses in a second system address range; creating a second entry in a range table buffer that includes translation data describing the second mapping; translating the first virtual memory address to a second system address using the second mapping; and issuing a write instruction for the second system address to the memory system of the data processing system.

19. The method of item 18, further comprising updating the copy-on-write status indicator after issuing a write instruction for the second system address to the memory system of the data processing system, to indicate that the range of virtual memory addresses is not shared.

20. The method of item 18, further comprising: the memory system, responsive to the request for an update to the first mapping, generating a mapping from the second system address range to physical addresses in one or more data resources.

21. The method of item 20, where the second system address range comprises a plurality of divisions and where generating the mapping from the second system address range to physical addresses in the one or more data resources comprises: allocating space in the one or more data resources; mapping the divisions of the second system address range to the same physical addresses as corresponding divisions of the first system address range, except for a division containing the second system address; mapping the division containing the second system address to the allocated space in the one or more data resources; and copying data associated with the division containing the second system address to the allocated space.

What is claimed is:

1. A data processing system comprising:
    a first memory address translation apparatus, including at least one range table buffer, accessible by one or more computing devices and configured to translate one or more virtual memory addresses in a first range of virtual memory addresses to one or more system addresses in a first range of system addresses; and
    a second memory address translation apparatus comprising:
        data resource allocation circuitry to allocate one or more data resources; and
        a system-to-physical address translator, configured to translate one or more system addresses in the first range of system addresses to a physical address in a physical address space of a data resource of the one or more data resources,
    where the data processing system is responsive to a copy request for a virtual memory address in the first range of virtual memory addresses to generate a second range of virtual memory addresses, where the second range of virtual memory addresses is separate and distinct from the first range of virtual memory addresses,
    where, subsequent to the copy request and prior to a write operation in the first or second range of virtual memory addresses, the first memory address translation apparatus is further configured to translate both the first and second ranges of virtual memory addresses to the first range of system addresses; and
    where, for a first entry in a range table buffer of the at least one range table buffer for which the range of virtual memory addresses defined by translation data of the first entry includes a given virtual memory address of the copy request, said generate the second range of virtual memory addresses comprises:
        writing a second entry to a range table buffer of the at least one range table buffer, the second entry indicative of new address range boundary values defining the second range of virtual memory addresses and indicative a new translation between a virtual memory address in the second range of virtual memory addresses and a corresponding system address in first system address range; and
        updating a copy-on-write (CoW) status indicator in the first entry and the second entry to indicate a shared first range of system addresses.

2. A data processing system comprising:
    a first memory address translation apparatus, accessible by one or more computing devices and configured to translate one or more virtual memory addresses in a first range of virtual memory addresses to one or more system addresses in a first range of system addresses; and
    a second memory address translation apparatus comprising:
        data resource allocation circuitry to allocate one or more data resources; and
        a system-to-physical address translator, configured to translate one or more system addresses in the first range of system addresses to a physical address in a physical address space of a data resource of the one or more data resources,
    where the data processing system is responsive to a copy request for a virtual memory address in the first range of virtual memory addresses to generate a second range of virtual memory addresses,
    where, subsequent to the copy request and prior to a write operation in the first or second range of virtual memory addresses, the first memory address translation apparatus is further configured to translate both the first and second ranges of virtual memory addresses to the first range of system addresses, and
    where the first range of system addresses comprises a first plurality of divisions and where, subsequent to a write operation to a system address in a first division of the first plurality of divisions, the second memory address translation apparatus is configured to:
        allocate space in a data resource of the one or more data resources;
        copy data associated with the first division to the allocated space;
        update the system-to-physical address translator to include a second range of system addresses, where the second range of system addresses comprises a second plurality of divisions corresponding to the first plurality of divisions and includes a second division corresponding to the first division;
        update the system-to-physical address translator to map either first division or the second division to the allocated space in the data resource; and
        update the system-to-physical address translator to map the second plurality of divisions to the same physical addresses as the first plurality of divisions, except that the first division and the corresponding second division are mapped to different physical addresses.

3. The data processing system of claim 2, where the first plurality of divisions comprises physical memory pages.

4. The data processing system of claim 2, where the first plurality of divisions comprises memory blocks from a block storage device.

5. The data processing system of claim 1, where the at least one range table buffer is configured to store translation data in one or more entries, where data stored in an entry are indicative of:

address range boundary values defining a range of virtual memory addresses between respective virtual memory address boundaries in a virtual memory address space;

a translation between a virtual memory address in the range of virtual memory addresses and a corresponding system address in a system address space; and a copy-on-write status.

6. The data processing system of claim 5, in which the translation is indicated by an address offset between a virtual memory address and a corresponding system address.

7. The data processing system of claim 1, where generating the second range of virtual memory addresses further comprises:

detecting the first entry in the range table buffer of the at least one range table buffer for which the range of virtual memory addresses defined by translation data of the first entry includes the given virtual memory address of the copy request.

8. The data processing system of claim 7, where the first and second entries are stored in the same range table buffer.

9. The data processing system of claim 7, where the first and second entries are stored in different range table buffers.

10. A non-transient computer readable medium comprising instructions of a hardware description language representative of the data processing system of claim 1.

11. A non-transient computer readable medium comprising a netlist representative of the data processing system of claim 1.

12. A method for performing a two-layer, copy-on-write operation in a data processing system, the method comprising:

assigning a first mapping that maps between a first range of virtual memory addresses in a virtual memory address space of a computing device and a first range of system addresses, where the first range of system addresses comprises a plurality of divisions;

assigning a second mapping that maps between the first range of system addresses and first physical addresses in one or more data resources;

on receiving a copy request for a virtual memory address in the first range of virtual memory addresses: assigning a third mapping between a second range of virtual memory addresses and the first range of system addresses;

on receiving a request to write data to a first system address in the first range of system addresses:

determining a first division of the plurality of divisions that contains the first system address;

allocating space in the one or more data resources to store a copy of data associated with the determined first division;

copying data associated with the determined first division to the allocated space;

assigning a fourth mapping between a second range of system addresses and the first physical addresses in the one or more data resources, where the second range of system addresses includes a second division corresponding to the determined first division;

when the write request is associated with a virtual memory address in the first range of virtual memory addresses:

updating the first mapping to map the first range of virtual memory addresses to the second range of system addresses; and updating the second mapping to map the determined first division to the allocated space in the one or more data resources;

when the write request is associated with a virtual memory address in the second range of virtual memory addresses:

updating the third mapping to map the second range of virtual memory addresses to the second range of system addresses; and updating the fourth mapping to map the second division to the allocated space in the one or more data resources;

translating the virtual memory address of the data to be written to a second system address; and writing the data to be written to the second system address.

13. The method of claim 12, where translation data indicative of the first mapping between the first range of virtual memory addresses and the first range of system addresses is stored in a first entry of a range table buffer and translation data indicative of the second mapping between the second range of virtual memory addresses and the first range of system addresses is stored in a second entry of a range table buffer, the method further comprising:

on receiving a copy request for a virtual memory address in the first range of virtual memory addresses, setting a copy-on-write (CoW) status indicator in each of the first and second entries to indicate a shared range of system addresses.

14. The method of claim 12, where translation data indicative of the first mapping between the first range of virtual memory addresses and the first range of system addresses is stored in a first entry of a range table buffer and translation data indicative of the second mapping between the second range of virtual memory addresses and the first range of system addresses is stored in a second entry of a range table buffer, the method further comprising:

on writing the data to the allocated space in the one or more data resources, clearing a copy-on-write bit in the first and second entries to indicate that range of system addresses is not shared.

15. The method of claim 12, where translation data indicative of the first mapping between the first range of virtual memory addresses and the first range of system addresses is stored in a first entry of a range table buffer, where data stored in the first entry are indicative of:

address range boundary values defining the first range of virtual memory addresses;

an offset between a virtual memory address in the first range of virtual memory addresses and a corresponding system address in the first range of system addresses; and a copy-on-write status, that indicates whether data in the first range of virtual memory addresses is shared with a second range of virtual memory addresses, where assigning the third mapping between the second range of virtual memory addresses and the first range of system addresses comprises:

copying the first entry to a second entry; and updating at least one range boundary value and the offset such that virtual memory addresses in the second range of virtual memory addresses map to the first range of system addresses.

16. The method of claim 12, further comprising mapping, by a range table buffer associated with a computing device of the data processing system, a virtual memory address in the first range of virtual memory addresses to a system address in the first range of system addresses.

17. The method of claim 12, further comprising mapping, by a system-to-physical address translator, a system address in the first range of system addresses to a first physical address in the one or more data resources.

18. A method for performing a write operation in a data processing system, the method comprising:
responsive to a request to write first data to a first virtual memory address in a range of virtual memory addresses:
locating an entry associated with the range of virtual memory addresses in a range table buffer;
when a copy-on-write (CoW) status indicator in the located entry indicates that the range of virtual memory addresses is not shared:
translating the first virtual memory address to a first system address in a first system address range using a first mapping from virtual memory addresses in the range of virtual memory addresses to system addresses, where the first mapping uses translation data in the entry; and
issuing a write instruction for the first system address to a memory system of the data processing system; and
when the CoW status indicator in the located entry indicates that the range of virtual memory addresses is shared:
requesting, from the memory system, an update to the first mapping to provide a second mapping that maps virtual memory addresses in the range of virtual memory addresses to system addresses in a second system address range;
creating a second entry in a range table buffer that includes translation data describing the second mapping;
translating the first virtual memory address to a second system address using the second mapping; and
issuing a write instruction for the second system address to the memory system of the data processing system,
where the second system address range comprises a plurality of divisions, and
where the memory system, responsive to the request for an update to the first mapping, generates a mapping from the second system address range to physical addresses in one or more data resources, including:
allocating space in the one or more data resources, where the allocated space has the same size as a division of the plurality of divisions that contains the second system address;
mapping the divisions of the second system address range to the same physical addresses as corresponding divisions of the first system address range, except for a division containing the second system address;
mapping the division containing the second system address to the allocated space in the one or more data resources; and
responsive to the write instruction for the second system address, the memory system storing the first data to the allocated space.

19. The method of claim 18, further comprising updating the copy-on-write status indicator after issuing a write instruction for the second system address to the memory system of the data processing system, to indicate that the range of virtual memory addresses is not shared.

* * * * *